United States Patent
Moldoveanu et al.

(10) Patent No.: US 12,092,781 B2
(45) Date of Patent: Sep. 17, 2024

(54) SYSTEM AND METHOD FOR SIMULTANEOUSLY ACQUIRING WIDE AZIMUTH AND OCEAN BOTTOM NODE SURVEYS

(71) Applicant: Schlumberger Technology Corporation, Sugar Land, TX (US)

(72) Inventors: Nicolae Moldoveanu, Houston, TX (US); Steve Fealy, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 128 days.

(21) Appl. No.: 17/760,335

(22) PCT Filed: Feb. 8, 2021

(86) PCT No.: PCT/US2021/017076
§ 371 (c)(1),
(2) Date: Aug. 8, 2022

(87) PCT Pub. No.: WO2021/162987
PCT Pub. Date: Aug. 19, 2021

(65) Prior Publication Data
US 2023/0084434 A1     Mar. 16, 2023

Related U.S. Application Data

(60) Provisional application No. 62/975,579, filed on Feb. 12, 2020.

(51) Int. Cl.
*G01V 1/38* (2006.01)

(52) U.S. Cl.
CPC .... *G01V 1/3808* (2013.01); *G01V 2210/1293* (2013.01); *G01V 2210/1297* (2013.01); *G01V 2210/165* (2013.01)

(58) Field of Classification Search
CPC .......... G01V 1/3808; G01V 2210/165; G01V 2210/1293; G01V 2210/1297
See application file for complete search history.

(56) References Cited

U.S. PATENT DOCUMENTS

| | | | | |
|---|---|---|---|---|
| 5,790,472 A | * | 8/1998 | Workman | B63B 21/66 367/19 |
| 2011/0158044 A1 | * | 6/2011 | Moldoveanu | G01V 1/3808 367/20 |

(Continued)

FOREIGN PATENT DOCUMENTS

WO    2020249701 A1    12/2020

OTHER PUBLICATIONS

Moldoveanu et al. ("Some Aspects of Survey Design For Wide-azimuth Towed streamer Acquisition." Paper presented at the 2007 SEG Annual Meeting, San Antonio, Texas, Sep. 2007.) (Year: 2007).*

(Continued)

*Primary Examiner* — Yuqing Xiao
*Assistant Examiner* — Christopher Richard Walker
(74) *Attorney, Agent, or Firm* — Jeffrey D. Frantz

(57) ABSTRACT

A method may include receiving, via a processor, a first set of seismic data acquired via a Wide Azimuth (WAZ) survey. The method may also include receiving a second set of seismic data acquired via an Ocean Bottom Survey (OBS) simultaneously during a time period in which the first set of seismic data is acquired. The method may then involve processing the second set of data to obtain a velocity model of seismic waves for an area that corresponds to the WAZ survey and OBS and generating one or more seismic images of the area based on the velocity model and the first set of data.

20 Claims, 6 Drawing Sheets

(56) References Cited

U.S. PATENT DOCUMENTS

| | | | |
|---|---|---|---|
| 2014/0081576 A1* | 3/2014 | Grenie | G01V 1/30 |
| | | | 702/14 |
| 2016/0097870 A1* | 4/2016 | Routh | G01V 1/282 |
| | | | 703/2 |
| 2017/0131418 A1* | 5/2017 | Wang | G01V 1/303 |
| 2017/0205520 A1 | 7/2017 | Moldoveanu et al. | |
| 2018/0172862 A1 | 6/2018 | Baardman et al. | |
| 2019/0064380 A1* | 2/2019 | Sharma | G01V 1/3808 |
| 2019/0120988 A1* | 4/2019 | O'Dowd | G01V 1/137 |
| 2019/0196038 A1 | 6/2019 | Willen | |

OTHER PUBLICATIONS

PCT International Search Report Written Opinion; PCT Application No. PCTUS2021/017076; May 7, 2021.

Bagaini, C, 2016: Shared Low Frequency Vibroseis Acquisition, EAGE 2016 Conference Proceedings, , May 2016, vol. 2016, p. 1-5.

Wittsten J. et al., 2019, Perfect partial reconstruction for multiple simultaneous sources, Geophysical Prospecting, 1019, 67, 1486-1497.

International Search Report and Written Opinion issued in PCT Application PCT/US2021/017076, dated May 7, 2022 (10 pages).

Douillard, A. P. et al., "Derisking Hild Field Development Through Wide-azimuth OBC and Multi-azimuth Streamer Depth Imaging", 71st EAGE Conference and Exhibition Incorporating SPE Europec, 2009, 5 pages.

Extended Search Report issued in European Patent Application No. 21754274.5 dated Feb. 19, 2024, 13, pages.

* cited by examiner

SYSTEM AND METHOD FOR SIMULTANEOUSLY ACQUIRING WIDE AZIMUTH AND OCEAN BOTTOM NODE SURVEYS

CROSS-REFERENCE TO RELATED APPLICATIONS

This application is a National Stage and claims benefit of PCT Patent Application No. PCT/US2021/017076, entitled "SYSTEM AND METHOD FOR SIMULTANEOUSLY ACQUIRING WIDE AZIMUTH AND OCEAN BOTTOM NODE SURVEYS," filed on Feb. 8, 2021, which claims priority to and the benefit of U.S. Provisional Application Ser. No. 62/975,579, entitled "SYSTEM AND METHOD FOR SIMULTANEOUSLY ACQUIRING WIDE AZIMUTH AND OCEAN BOTTOM NODE SURVEYS," filed on Feb. 12, 2020, each of which is incorporated by reference herein for all purposes.

BACKGROUND

The present disclosure relates generally to performing multiple types of seismic surveys using various azimuth distributions. More specifically, the present disclosure relates to exploring complex geological structures and obtaining an accurate velocity model for the same.

In hydrocarbon exploration, seismic images of underground layers are relied on to locate hydrocarbon reservoirs, such as oil fields. Thus, accuracy of the seismic images helps to more accurately determine locations of the hydrocarbon reservoirs. Various azimuth distributions may be used to acquire azimuth data that may then be used to generate the seismic images. One example of these azimuth distributions is wide azimuth (WAZ) in which multiple vessels sail along a same direction (e.g., parallel with each other) and acquire seismic data. In WAZ, some of the vessels emit seismic waves into the sea, while some of the vessels (e.g., same vessels or other vessels) acquire reflections of the seismic waves via towed-streamers. Hereinafter, the towed-streamers will be referred to as streamers for simplicity.

For imaging through complex structures, such as embedded salt layers, the accuracy of a velocity model of seismic waves traversing various areas affects the accuracy of processing of the seismic data. However, obtaining an accurate velocity model may be a challenge in geographical areas having complex structural layers.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system may involve a plurality of streamers having one or more streamer sensors that may acquire a first set of seismic data representative of one or more features of a subterranean region. The system may also include a plurality of ocean bottom modes that may acquire a second set of seismic data representative of the one or more features of the subterranean region and a processing system. The processing system may receive the first set of seismic data and the second set of data, process the second set of data to obtain a velocity model of seismic waves for the subterranean region, and generate one or more seismic images of the subterranean region based on the velocity model and the first set of seismic data.

In another embodiment, a method may include receiving, via a processor, a first set of seismic data acquired via a Wide Azimuth (WAZ) survey. The method may also include receiving a second set of seismic data acquired via an Ocean Bottom Survey (OBS) simultaneously during a time period in which the first set of seismic data is acquired. The method may then involve processing the second set of data to obtain a velocity model of seismic waves for an area that corresponds to the WAZ survey and OBS and generating one or more seismic images of the area based on the velocity model and the first set of data.

In yet another embodiment, a non-transitory computer-readable medium may include computer-executable instructions that, when executed, cause at least one processor to perform one or more operations that may include receiving a first set of seismic data during a first portion of a Wide Azimuth (WAZ) survey and receiving a second set of seismic data acquired via an Ocean Bottom Survey (OBS) simultaneously during a time period in which the first set of seismic data is acquired. The operations may then involve processing the second set of data to obtain a velocity model of seismic waves for an area that corresponds to the WAZ survey and OBS and generating one or more seismic images of the area based on the velocity model and the first set of seismic data.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWING

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
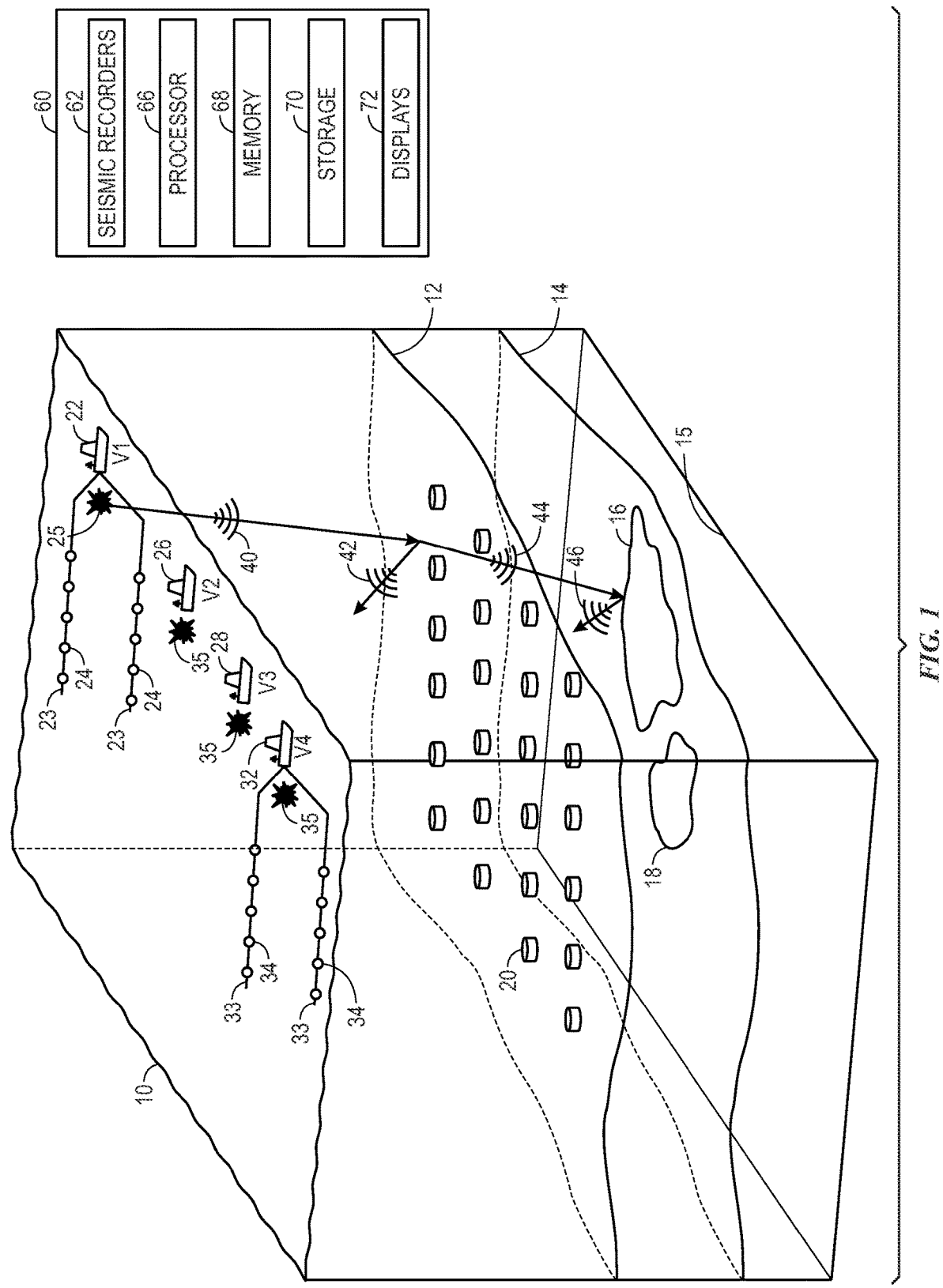
FIG. 1 illustrates a schematic diagram of a water seismic survey using multiple seismic measurements, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementations-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. It should be noted that the term "multimedia" and "media" may be used interchangeably herein.

As mentioned above, in hydrocarbon exploration, seismic images of underground layers are relied on to locate hydrocarbon reservoirs, such as oil fields. Thus, accuracy of the seismic images helps to more accurately determine locations of the hydrocarbon reservoirs. Various azimuth distributions may be used to acquire azimuth data that may then be used to generate the seismic images. One example of these azimuth distributions is wide azimuth (WAZ) in which multiple vessels sail along a same direction (e.g., parallel with each other) and acquire seismic data. In WAZ, some of the vessels emit seismic waves into the sea, while some of the vessels (e.g., same vessels or other vessels) acquire reflections of the seismic waves via towed-streamers. Hereinafter, the towed-streamers will be referred to as streamers for simplicity.

Keeping this in mind, the quality of seismic images acquired by propagating seismic waves through complex structures, such as embedded salt layers, may rely on an accuracy of a velocity model of the seismic waves traversing the target areas. That is, the velocity model of the target area affects the accuracy of processing of the seismic data. However, obtaining an accurate velocity model may be a challenge in geographical areas having complex structural layers. As such, additional data acquisition processes may be undertaken to determine an accurate velocity model for these geographical areas. For example, in some parts of the Gulf of Mexico, seismic data acquired using one or more azimuth distributions did not properly image embedded salt layers because the velocity model of the seismic waves used in imaging did not have a threshold amount of precision and/or accuracy to reveal the salt layers. To obtain a more accurate velocity model, Ocean Bottom Surveys (OBS) may acquire seismic data that can be used to determine the velocity model. OBS may be performed before or after azimuth surveys, but these acquisitions add to the cost of seismic data acquisition by streamers and involves more time because of the additional seismic data acquisition step using Ocean Bottom Nodes (OBN) of the OBS and corresponding towed sources.

With the foregoing in mind, the present disclosure is directed to a method for simultaneously acquiring the WAZ data and OBS data to obtain an accurate velocity model that may be employed in seismic data processing to generate seismic images. By performing the embodiments described herein, the present disclosure may reduce the time and cost generating these seismic images while performing seismic surveys that use WAZ data and OBS data. Additional details regarding improving seismic data processing and analysis based on seismic surveys that use WAZ data and OBS data are described below with reference to FIGS. 1-6.

By way of introduction, FIG. 1 illustrates a schematic diagram of a marine seismic survey using multiple seismic measurements. As shown in FIG. 1, the marine seismic survey may be performed on body of water (e.g., ocean) having a surface 10 and a water bottom 12. Multiple subsurface layers (e.g., subsurface layers 14 and 15) may be located beneath the water bottom 12. Geological formations, such as subsurface formations 16 and 18 embedded in the subsurface layers, may contain hydrocarbon deposits. Seismic data acquired via the marine seismic survey may be used to image the water bottom 12, the subsurface layers 14 and 15, and the subsurface formations 16 and 18. Images of subterranean geologic structures may provide indications of the hydrocarbon deposits that may later be extracted using a variety of hydrocarbon extraction processes.

In some embodiments, the marine seismic survey may include ocean bottom node (OBN) measurements by employing multiple ocean bottom nodes (OBNs) 20 positioned on the water bottom 12. The OBNs may be deployed (e.g., using remotely operated vehicles (ROVs)) to selected locations and form a certain geometry (e.g., an OBN patch with 200 meters by 200 meters grid size). Each of the OBNs 20 may include one or more OBN sensors. The OBN sensors may include one or more geophones (e.g., single-component, two-component, three-component geophones). In some embodiments, the OBN sensors may also include hydrophones.

Ocean bottom acquisition systems including the ocean bottom node (OBN) or the ocean bottom cable (OBC) may be utilized to obtain more accurate seismic survey data in water complex geologic areas. For example, a seismic survey employing OBNs in water having complex geologic structures may involve deploying an OBN patch (e.g., a 2D OBN array) and a dense grid of sources to effectively image the subsurface from the water bottom to a certain depth. The dense grid of sources may be produced by multiple seismic vessels sailing along one or more sides of the OBN patch.

One or more seismic source vessels may be used in the marine seismic survey. For example, a source vessel 22 towing a seismic source 25 and another source vessel 32 towing another seismic source 35 may be used to create seismic waves propagating downward into the subterranean geologic structures. Each of the seismic sources 25 and 35 may include one or more source arrays and each source array may include a certain number of air guns or other seismic wave generating device.

The marine seismic survey may also include multiple streamers traversing the body of water to obtain streamer measurement data. For example, the source vessel 22 may tow multiple (e.g., two, four, six, eight, or ten) streamers 23 along one sail line, and the source vessel 32 may tow multiple streamers 33 along another sail line. The streamer measurement data may be acquired simultaneously with the OBN measurement using shots fired by the seismic sources 25 and 35. That is, each streamer may include multiple streamer sensors. For example, each of the streamers 23 may include streamer sensors 24 and each of the streamers 33 may include streamer sensors 34. The streamer sensors 24 and 34 may include hydrophones that create electrical signals in response to detected water pressure changes caused by reflected seismic waves that arrive at the hydrophones. In this way, the seismic waves generated by the sources 25 and 35 may be reflected off of the subterranean regions at or under the water bottom 12, and the reflected seismic waves may be detected by the streamer sensors 24 and 34.

In addition to the source vessels 22 and 32, the marine seismic survey may also include additional source vessels 26 and 28 with seismic sources 27 and 29. Moreover, although not shown, the source vessels 26 and 28 may include streamers and other equipment as described as being part of the source vessels 22 and 32. Although the following description of the embodiments described herein are detailed with four source vessels, it should be noted that the techniques described herein may be performed using any suitable number of source vessels and are not limited to the description in FIG. 1.

In some embodiments, the marine seismic survey may include vertical seismic profile (VSP) measurement by employing seismic sensors (e.g., fiber-optic sensors, geophones, or hybrid sensors) in one or more wells. For example, a hybrid sensor array including fiber-optic sensors and geophones may be disposed along a wireline cable deployed in a borehole of a well, which may be drilled into the subsurface formation 16. The fiber-optic sensors may measure strains caused by reflected or refracted seismic waves traveling along the hybrid sensor array. The geophone may measure ground motions (e.g., particle movements such as velocity and acceleration) caused by seismic waves traveling along the hybrid sensor array.

During the marine seismic survey, the seismic source 25 may be activated to generate seismic waves 40 traveling downward into the subterranean geologic structures. When the seismic waves 40 arrives at the water bottom 12, a portion of seismic energy contained in the seismic waves 40 is reflected by the water bottom 12. Reflected waves 42 travel upward and arrive at different sensors, such as the streamer sensors 24 and 34, where they are measured by corresponding sensors. Another portion of the seismic energy contained in transmitted seismic waves 44 propagated through the water bottom 12 into the subsurface layer 14. A portion of seismic energy contained in the transmitted waves 44 is reflected by the subsurface formation 16. Reflected waves 46 travel upward and arrive at the different sensors, where they are measured by the corresponding sensors.

It should be noted that the elements described above with regard to the marine seismic survey are exemplary elements. For instance, some embodiments of the marine seismic survey may include additional or fewer elements than those shown. For example, as mentioned above, the marine seismic survey may include different number of source vessels. In some embodiments, separated receiver vessels may be used to tow the streamers. In some embodiments, the streamer measurement may be acquired independently from the OBN measurement for operational or logistical reasons.

Seismic data simultaneously acquired from different sensors may be collected and processed by a processing system 60. The processing system 60 may include one or more seismic recorders 62, a processor 66, a memory 68, a storage 70, one or more displays 72, and the like. The one or more seismic recorders 62 may receive ocean bottom node (OBN) data from OBNs 20, streamer data from streamer sensors 24 and 34 or other suitable seismic sensors. Collected data may be processed by the processor 66 using processor-executable code stored in the memory 68 and the storage 70. The processed data may be stored in the storage 70 for later usage. Processing results may be displayed via the one or more displays 72. Data processing based on multiple measurements will be discussed in detail below with reference to FIG. 6.

The processor 66 may be any type of computer processor or microprocessor capable of executing computer-executable code. The processors 66 may include single-threaded processor(s), multi-threaded processor(s), or both. The processors 66 may also include hardware-based processor(s) each including one or more cores. The processors 66 may include general purpose processor(s), special purpose processor(s), or both. The processors 66 may be communicatively coupled to other components (such as one or more seismic recorders 62, memory 68, storage 70, and one or more displays 72).

The memory 68 and the storage 70 may be any suitable articles of manufacture that can serve as media to store processor-executable code, data, or the like. These articles of manufacture may represent computer-readable media (e.g., any suitable form of memory or storage) that may store the processor-executable code used by the processor 66 to perform the presently disclosed techniques. The memory 68 and the storage 70 may also be used to store data described (e.g., fiber sensor data, geophone data), various other software applications for seismic data analysis and data processing. The memory 68 and the storage 70 may represent non-transitory computer-readable media (e.g., any suitable form of memory or storage) that may store the processor-executable code used by the processor 66 to perform various techniques described herein. It should be noted that non-transitory merely indicates that the media is tangible and not a signal.

The one or more displays 72 may operate to depict visualizations associated with software or executable code being processed by the processor 66. The display 72 may be any suitable type of display, such as a liquid crystal display (LCD), plasma display, or an organic light emitting diode (OLED) display.

It should be noted that the components described above with regard to the processing system 60 are exemplary components and the processing system 60 may include additional or fewer components as shown. For example, the processing system 60 may include one or more communication interfaces to send commands to different seismic acquisition systems and receive measurement from the different seismic acquisition systems.

With the foregoing in mind, a wide azimuth (WAZ) survey of an area of interest may be performed using streamer sensors 24 and 34. For example, during a first portion of the WAZ survey, OBS data may be acquired via the OBNs 20. Using the data acquired from the first portion of the WAZ survey and the OBS data, the processing system 60 or any suitable computing device may determine a velocity model for the seismic waves using a full waveform inversion (FWI) technique. The processing system 60 may then use the velocity model to generate a seismic image representative of the area of interest that corresponds to the WAZ and the OBS data. By acquiring the OBS data simultaneously with the WAZ survey data, the present embodiments described herein may reduce the amount of time and processing power used by the processing system 60 to generate a seismic image. That is, by performing the WAZ survey and the OBS simultaneously, as opposed to performing these surveys at different times, the processing system 60 may process the acquired seismic data with respect to each other to more efficiently process the acquired seismic data.

By way of example, the WAZ survey may first involve using streamers to scan a continuous surface area via sail lines that do not overlap each other. Seismic data (e.g., reflections) may be acquired via receivers disposed on the streamers during a portion of the WAZ survey. In some embodiments, the area of interest for the WAZ survey is laterally divided into multiple subareas (e.g., first area portions) disposed next to each other, such that sail lines of the subareas do not overlap. In each of the subareas, the streamers may sail in a first direction and an opposite second direction along their respective sail lines to acquire the WAZ data during the first portion of the WAZ survey. In this manner, the streamers may scan the entire area, while none of the sail lines may overlap. In some embodiments, none of the shots of the shot sources of the vessels may overlap with each other in a lateral direction. The lateral direction may correspond to a direction along the sea surface and perpendicular to the sail lines.

According to one or more embodiments, a single source per shot point may be sufficient to obtain the velocity model using full waveform inversion (FWI) of the OBN data. Thus, the velocity model may be determined during the first portion of the WAZ survey using a single shot. While acquiring the WAZ data during the first portion of the WAZ survey, the OBS data may be acquired simultaneously. Since the WAZ data is acquired simultaneously with the OBS data, the receivers (e.g., nodes) for the OBS may be positioned further apart or sparser than receivers of an OBS performed without the streamers recording data for the WAZ survey. For example, in an OBS without a simultaneous WAZ survey being performed, each receiver may be disposed about 400 meters (m) away from adjacent receivers to enable the OBS data to include sufficient details to generate a velocity model. However, by performing OBS simultaneously with the WAZ survey, this distance may be more than 400 m, for example around 1000 m or 1200 m, thereby reducing the cost of performing the OBS.

In addition to performing WAZ surveys using one source array per vessel or streamer, in some embodiments, multiple source arrays may be used per vessel or streamer. Using multiple source arrays per vessel may increase resolution of the seismic images, may allow for the receivers (e.g., nodes) for the OBS to be disposed sparser than receivers of an OBS using a single source, and the like. Moreover, using multiple source arrays in a vessel or streamer may increase signal-to-noise ratio by increasing the shots' strengths. That is, the source arrays providing a single shot may be installed with a pitch distance of less than half of a wavelength of the seismic waves (e.g., in the seawater to which the seismic waves are emitted) that the source arrays generate. For example, assuming the wavelength of the seismic waves is about 150 m, the pitch distance between adjacent source arrays may be less than 75 m, such as 50 m, which may be a function of the streamer separation.

By way of introduction, accurate imaging of hydrocarbon reservoirs located under complex salt bodies or structurally complex overburden may be determined using: (1) seismic data with good offset and azimuth distribution; and (2) an accurate velocity model that may be used to image the seismic data. However, these two conditions may not be available in many areas. For example, in some parts of the Gulf of Mexico, seismic data acquired with towed streamers using Narrow Azimuth, Wide Azimuth, and Full Azimuth acquisition geometries did not provide sufficient data to properly image subsalt structures because a velocity model used in imaging was not accurate enough to fully reveal the subsalt structures.

As such, in some embodiments, acquiring an Ocean Bottom Survey (OBS) in addition to the existent data may assist in obtaining an accurate velocity model that can be used with other seismic data processing techniques to obtain accurate images of the subsalt structures. The full azimuth and long offset OBN data (e.g., more than 40 km offset) may allow to derive an accurate velocity model using Full Waveform Inversion (FWI). The resulting velocity model may be used to image the existent data and the OBN data. The images from the two acquisitions may then be combined to get an improved subsurface image. As such, one or more embodiments disclosed herein may be applicable for the areas where seismic data with good offset and azimuth distribution, like Wide Azimuth and Full azimuth, is not available. To reduce the cost of seismic exploration and the exploration cycle time, Wide Azimuth towed-streamer seismic data and OBN data for velocity model building may be acquired in the same time.

Figure 2:
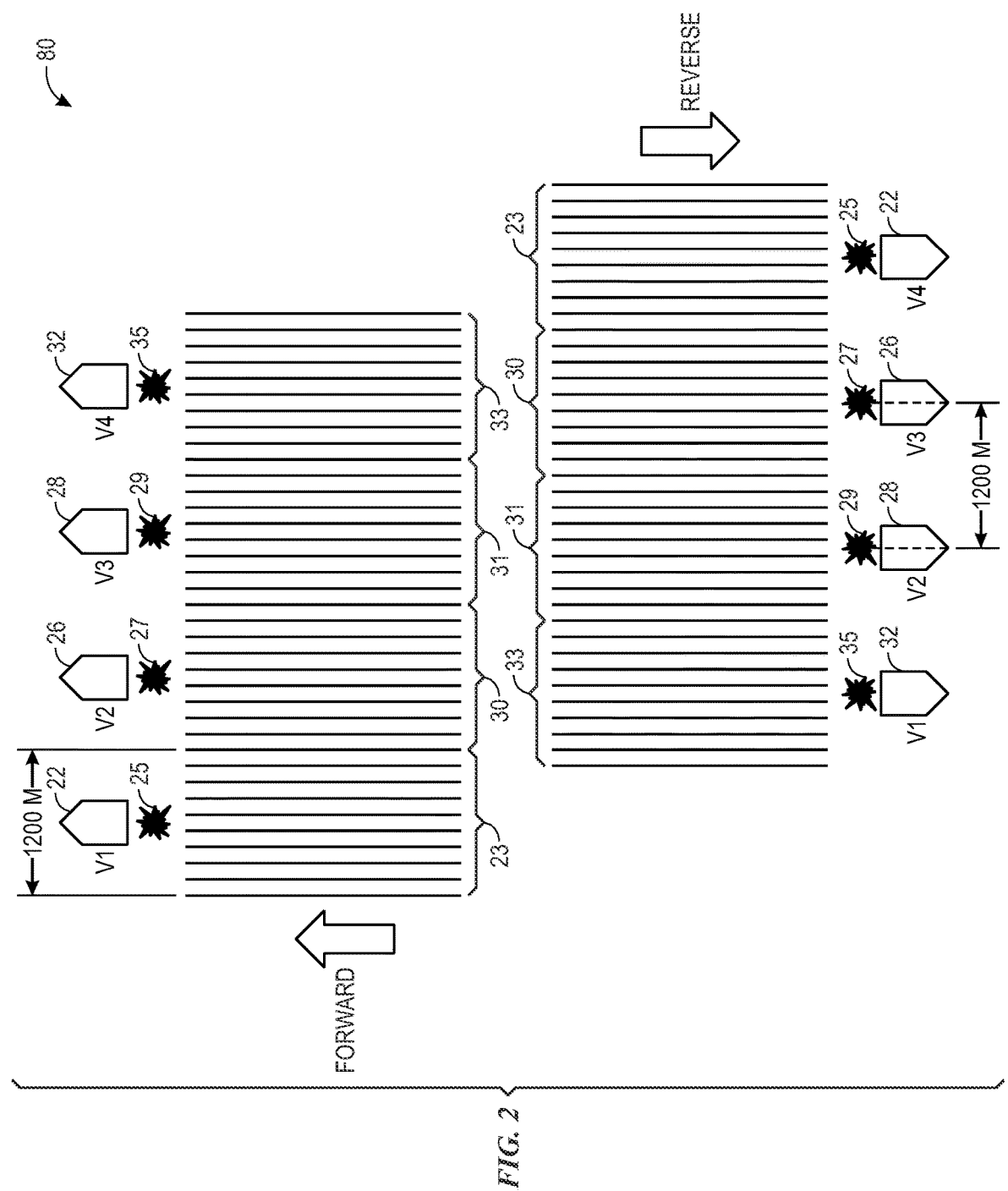
FIG. 2 illustrates an example towed-streamer wide azimuth configuration employed in the water seismic survey of FIG. 1, in accordance with embodiments described herein.

With the foregoing in mind, FIG. 2 presents an example configuration for towed-streamer WAZ acquisition survey 80 with reference to sail lines employed when acquiring the seismic data. In the embodiment illustrated in the WAZ acquisition survey 80 of FIG. 2, the source vessels 26 and 32 may be present along with streamers 23 and 33. In addition to the source vessels 26 and 32, source vessels 26 and 28 may also be part of the WAZ acquisition survey 80 with corresponding streamers 30 and 31 (e.g., having respective streamer sensors). In certain embodiments, the distance between the source vessels may be a function of number of streamers and streamer separation distances. For instance, a sail line interval may be defined as:

$$\text{Sail line interval} = \text{number of streamers} \times \text{streamer separation} \quad (1)$$

As such, assuming that there are 12 streamers 23 following source vessel 22 and each streamer is separated by 100 meters (m) from each other, the sail line interval is 1200 m.

In the particular embodiment depicted in FIG. 2, each source vessel 22, 26, 28, 32 may be equipped with one source array. The four vessels shown in FIG. 2 may sail in one direction (e.g., forward) and in opposite direction (e.g., reverse) in an interleaved manner with an interval that is half of the sail line interval. That is, referring to FIG. 2, the sail line interval is 1200 m for each source vessel 22, 26, 28, 32 and the interval between adjacent sail lines (i.e., sail line interval) is 600 m, which is the distance between one forward sail line and an adjacent reverse sail line. In this way, the forward sail line may overlap over half of the adjacent reverse sail line.

Figure 3:
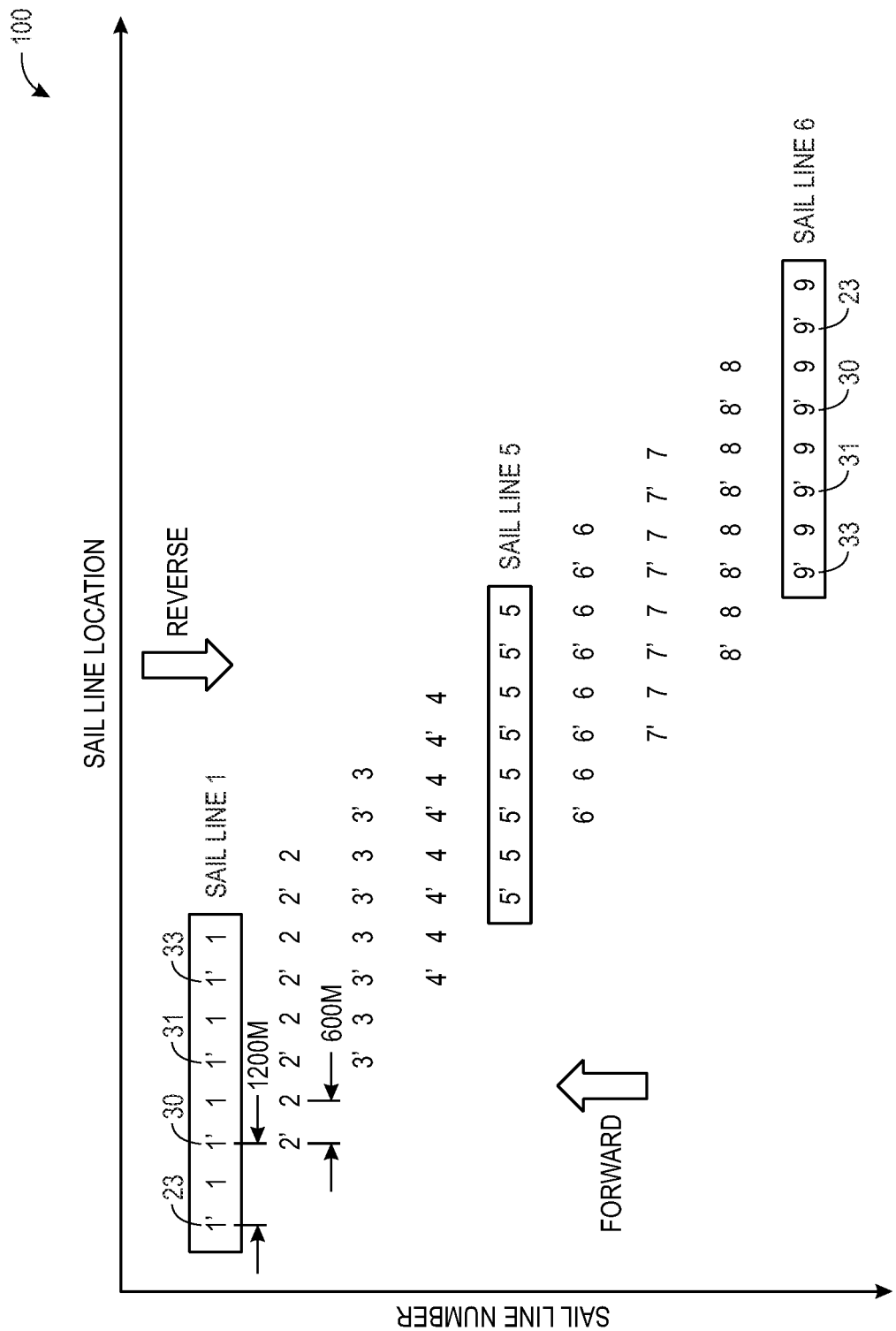
FIG. 3 illustrates an example shooting pattern for the towed-streamer wide azimuth configuration of FIG. 2, in accordance with embodiments described herein.

With this in mind, FIG. 3 illustrates an example of WAZ shooting configuration 100 in which some of the sail lines overlap. Referring briefly back to FIG. 2, each of the streamers 23, 30, 31, 33 following the source vessels 22, 26, 28, 32 may correspond to a particular sail number in the WAZ shooting configuration 100 of FIG. 3. For example, when sailing in a forward or first direction, a first streamer of a set of streamers following each of the source vessels 22, 26, 28, 32 is represented by a number with a prime symbol (e.g., 1'). As such, the four 1' values depicted in the WAZ shooting configuration 100 corresponds to one streamer of each set of streamers (e.g., 23, 30, 31, 33) following a respective source vessel 22, 26, 28, 32. In this way, the number depicted in FIG. 3 corresponds to a sail line number for the seismic survey using the four source vessels 22, 26, 28, 32 and the respective streamers 23, 30, 31, 33.

In addition, reverse sail lines in which the streamers 23, 30, 31, 33 travel in a second direction opposite to the first direction during the seismic survey are depicted without a prime symbol next to the sail line number (e.g., 1). That is, after the streamers 23, 30, 31, 33 acquire seismic data while traveling via a first sail line (e.g., 1') in the forward direction, the streamers 23, 30, 31, 33 may again acquire seismic data via the first sail line (e.g., 1) while traveling in the reverse direction.

As shown in FIG. 3, the source vessels 22, 26, 28, 32 may be separated by approximately 1200 meters (+/−5%). As such, the sail line interval between streamers 23, 30, 31, 33 is 1200 meters. Referring again to FIG. 3, the interleaved sail line in which the streamers overlap sail lines traversed by each other corresponds to half of sail line interval or 600 meters. In FIG. 3, the horizontal axis is along a lateral direction, which is perpendicular to the sail lines.

According to the WAZ shooting configuration 100, each source line is repeated 4 times or each shot point in WAZ seismic survey is repeated 4 times at 1200 meter intervals. For example, as mentioned above, the forward sail lines annotated by "1'" may correspond to streamers 23, 30, 31, 33 that sail in the forward direction and the reverse sail lines annotated by "1" may correspond to streamers 23, 30, 31, 33 that sail in the reverse direction. Similar configurations may be applied to the sail lines with other annotation numbers. For example, the sail lines annotated by "2'" or 2" may correspond to the streamers 23, 30, 31, 33 that are laterally displaced by the sail line interval (e.g., 1200 m).

In some embodiments, the WAZ seismic survey may be performed with less than four shots per shot station to obtain a velocity model using a full wave inversion (FWI) method. That is, the WAZ seismic survey may be performed using a single source per shot point and the acquired seismic data may then be used with the FWI process. For instance, the WAZ seismic data may be acquired in two passes (e.g., steps) as described below.

In the first pass, a first set of seismic data used for FWI may be acquired via the streamers 23, 30, 31, 33. The first set of seismic data may be acquired such that sail lines traversed by the source vessels 22, 26, 28, 32 may provide continuous subsurface coverage without overlapping shots (i.e., no sail lines overlapping). As such, the seismic data acquired by the streamers 23, 30, 31, 33 may receive reflected seismic data from a corresponding seismic source of a respective source vessels 22, 26, 28, 32. For example, during a first pass, the WAZ seismic data may be acquired by the streamers 23, 30, 31, 33 via sail line 1. That is, for example, source vessel 22 may activate the source 25 while traversing the sail line 1 and the streamers 23, 30, 31, 33 may receive the resulting reflected seismic data.

In subsequent passes, the WAZ seismic data for the rest of the sail lines are acquired. For example, in the WAZ shooting configuration 100 of FIG. 3, the WAZ seismic data may be acquired via sail lines 2, 3, and 4 by activating sources associated with source vessels 26, 28, and 32, respectively, and recording the resulting reflected seismic data via the streamers 23, 30, 31, 33.

With the forgoing in mind, ocean bottom survey (OBS) data may also be acquired simultaneously with the reflected seismic data acquired via the streamers 23, 30, 31, 33 to perform embodiments described herein. That is, the OBS data (hereinafter may also be referred to as OBN survey) may also be acquired during the first pass. In this way, the OBN data acquired via the OBN 20 during the first pass of the WAZ shooting configuration 100 described above may be used to calculate a velocity model for the subsurface layers 14 and 15. The velocity model may represent one or more rates at which one or more waves travel through a medium (e.g., a scalar) or one or more rates at which a body (e.g., water, subsurface regions) are displaced in a given direction (a vector).

By obtaining the OBS data after the first pass, the processing system 60 or other suitable computing device may determine a corresponding velocity model based on the OBS data before completing the WAZ survey using the WAZ shooting configuration 100. In this way, a total amount of processing time for performing the combined WAZ and OBN surveys may be reduced. That is, by simultaneously performing the WAZ and OBN surveys together, performing additional WAZ surveys to determine the velocity model may be avoided because the OBS data may be used to determine the velocity model.

Keeping this in mind, it should be noted that sparse OBN data acquired during the WAZ survey may not include data with a sufficient amount of details to build an accurate velocity model using FWI. However, according to one or more embodiments, by sampling the OBN data, the receiver (node) sampling could be sparser than for regular OBS, which is typically 400 m×400 m. Indeed, by employing the embodiments described herein, the receiver sampling may be performed at 1000 m×1000 m or 1200 m×1200 m spacing.

The shot sampling for OBNs 20 may be a function of the sail line interval (e.g., according to the interleaved space). According to one or more embodiments, the shot sampling in crossline direction (i.e., lateral direction) may be 600 m. The shot sampling in the inline direction may be a function of a number of source arrays that are installed on each source vessel 22, 26, 28, 32. For example, in case each of the source vessels 22, 26, 28, 32 shown in FIG. 2 includes a single source array and that a nominal shot interval between the source vessels 22, 26, 28, 32 is 25 m and shooting is sequential, the shot interval along the source line is 4×25 m=100 m. Thus, the OBN source sampling for the described configuration may be 100 m×600 m. In other words, the sampling in the lateral direction is 600 m, which corresponds to the distance between adjacent sail lines, and the sampling along the sail line direction is 100 m, which corresponds to the source shot cycle of the four source vessel 22, 26, 28, 32 in FIG. 2.

Figure 4:
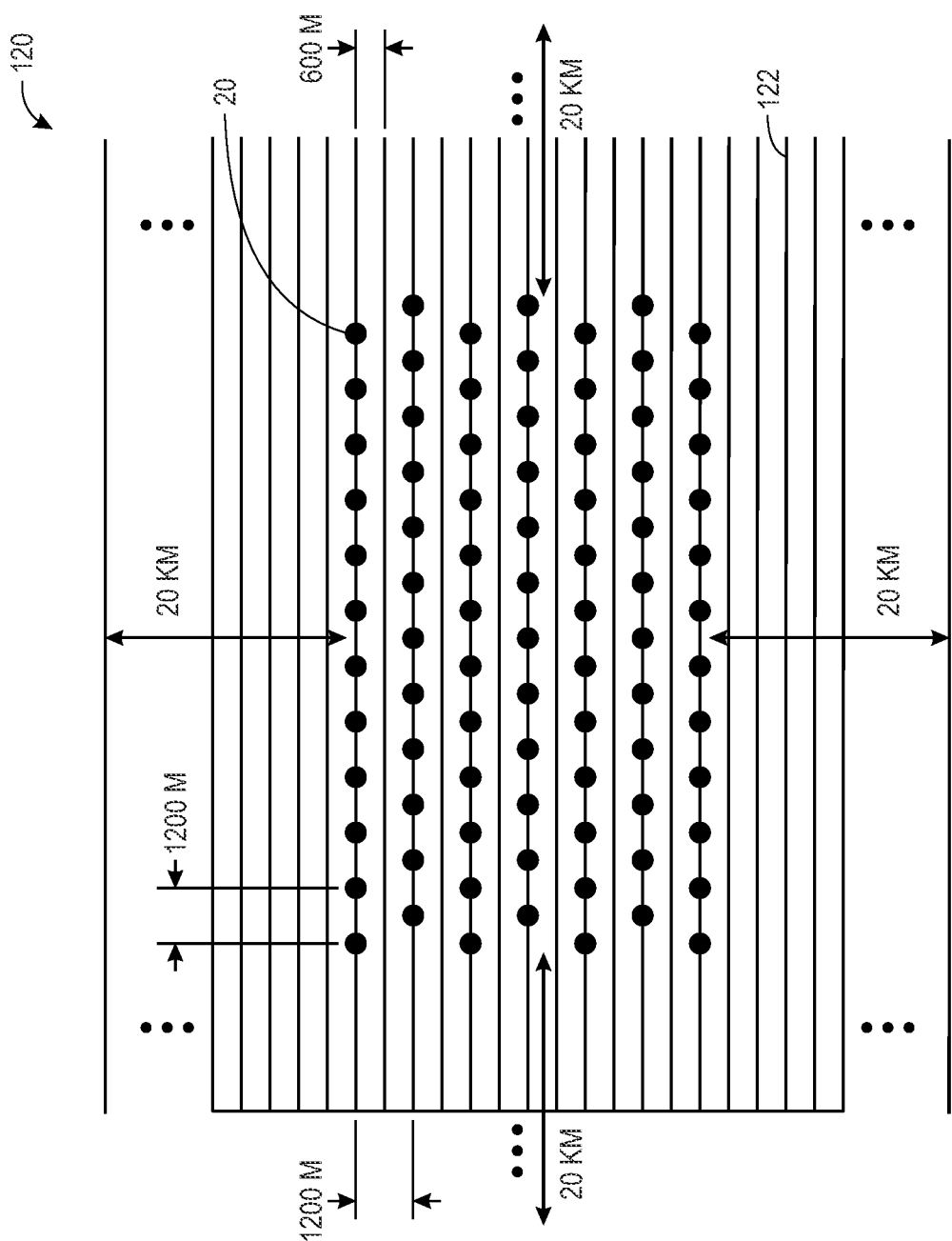
FIG. 4 illustrates an example layout for nodes and a wide azimuth layout for simultaneous acquisition of a wide azimuth survey and an ocean bottom node survey, in accordance with embodiments described herein.

With this in mind, FIG. 4 illustrates an example deployment configuration 120 for OBNs 20 (e.g., receivers) for simultaneous acquisition of OBN and WAZ surveys according to one or more embodiments. The deployment configuration 120 illustrates a presence of a shot halo around the OBNs 20 that may be 20 km or less, depending on a maximum specified offset in the surveyed area. In some embodiments, the shot line interval or the distance between shot lines 122 that correspond to the WAZ seismic survey may be 600 m with shot spacing between 50 to 100 m during the WAZ seismic survey.

Figure 5:
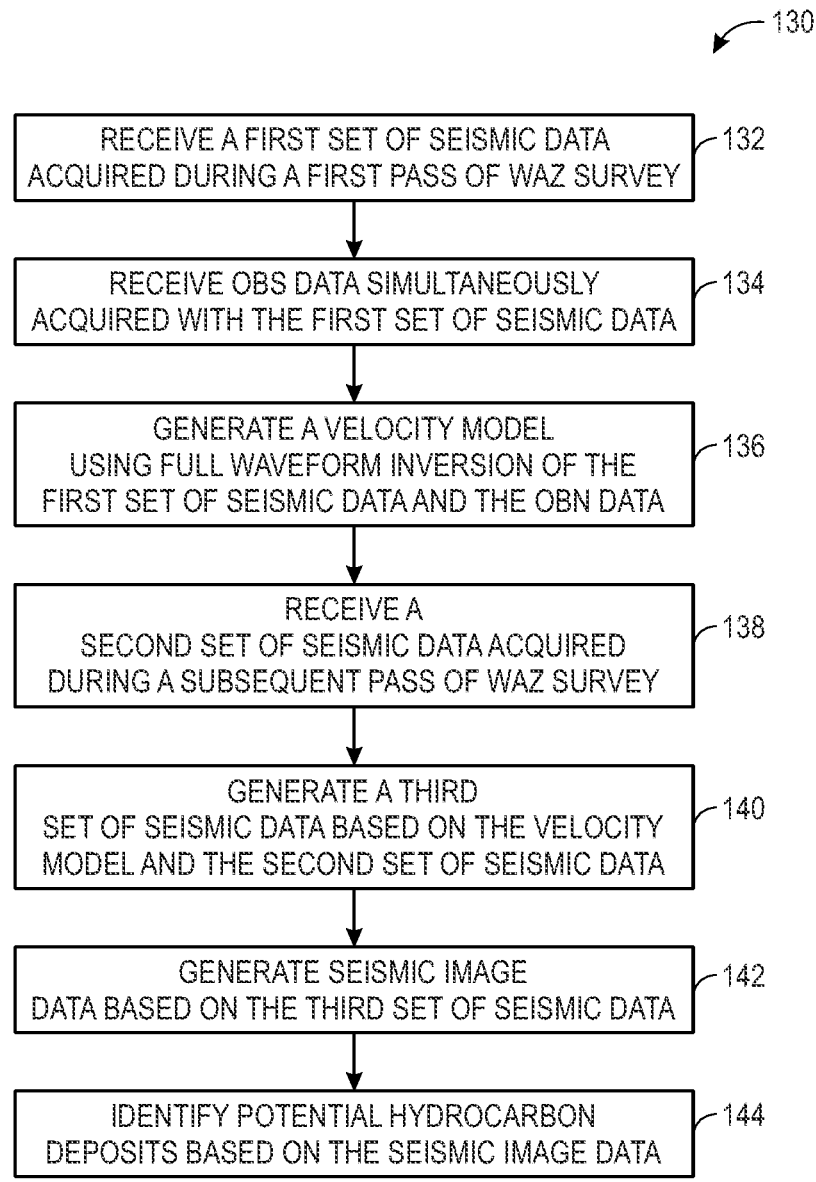
FIG. 5 illustrates a flow chart of a method for processing ocean bottom nodes (OBN) data and simultaneously acquired wide azimuth (WAZ) data to identify hydrocarbon deposits within subsurface regions of the earth, in accordance with embodiments described herein.

FIG. 5 illustrates a flow chart of a method 130 for processing OBN data and simultaneously acquired WAZ data to identify potential hydrocarbon deposits in subsurface regions of the earth. Although the following method 130 is described as being performed in a particular order, it should be understood that the method 130 may be performed in any suitable order. Moreover, although the method 130 is described as being performed by the processing system 60, it should be understood that the method 130 may be performed by any suitable computing device. Additionally, although the following description of the method 130 refers to data acquired using the acquisition configurations and methodologies described above, it should be noted that the seismic data used to perform the method 130 may not be limited to the specific number of streamers, seismic sources, OBNs, and other details mentioned above. Instead, the method 130 may be performed using seismic data acquired via a variety of suitable configurations.

Referring now to FIG. 5, at block 132, the processing system 60 may receive a first set of seismic data that corresponds to reflected seismic data acquired during a first pass of the WAZ seismic survey described above with reference to FIG. 3. As such, the first set of seismic data may correspond to reflected seismic waves acquired by sensors of the streamers 23, 30, 31, 33 in response to the seismic waves produced by one or more seismic sources while the streamers 23, 30, 31, 33 traverse sail line 1 of FIG. 3.

At block 134, the processing system 60 may receive OBS data acquired via the OBNs 20. The OBS data may correspond to the reflected seismic waves acquired by the sensors of the streamers 23, 30, 31, 33 in response to the one or more seismic sources while the streamers 23, 30, 31, 33 traverse sail line 1 of FIG. 3. As such, the OBS data may have been acquired simultaneously while the sensors of the streamers 23, 30, 31, 33 collected reflected seismic waves. In this way, the seismic data acquired by the sensors of the streamers 23, 30, 31, 33 and the OBS data may represent the same geological characteristics of the same subsurface region of the earth.

After receiving the first set of seismic data and the OBS data, the processing system 60 may, at block 136, generate a velocity model using a full waveform inversion (FWI) process based on the first set of seismic data and the OBS data. The FWI process may iteratively minimize differences between the first set of seismic data and the OBS data and generate a velocity model representative of the subsurface region that reflected seismic waves originally produced by one or more seismic sources while the streamers 23, 30, 31, 33 were traversing sail line 1. By using the OBS data and the first set of data to generate the velocity model the two sets of data may be used to confirm properties and characteristics in each respective set of data. As a result, the velocity model generated based on these two simultaneously acquired seismic data sets may be more accurate as compared to a velocity model determined based on using either seismic data set by itself, using multiple seismic data sets acquired using the same receivers (e.g., OBNs or streamer sensors) representative of different seismic shots, and the like.

At block 138, the processing system 60 may receive a subsequent set of seismic data acquired during additional passes of the WAZ seismic survey. That is, for example, the subsequent or second set of seismic data may be acquired after the streamers 23, 30, 31, 33 traverses sail line 1. In some embodiments, the processing system 60 may receive a number of sets of seismic data acquired during additional passes of the WAZ seismic survey. In any case, using the second (or additional) set(s) of seismic data, the processing system 60 may, at block 140, generate a third set of seismic data based on the velocity model and the second set (or additional sets) of seismic data received at block 138. As such, the processing system 60 may process the second set of seismic data using the velocity model to more accurately characterize the reflected seismic waves recorded in the second set of seismic data. The velocity model may allow the processing system 60 to filter and shift the second set of seismic data, such that the recorded seismic reflections more accurately represent features within the subsurface region of the earth from which the seismic waves generated by a respective seismic source reflected.

At block 142, the processing system 60 may generate seismic image data representative of the corresponding subsurface region of the earth based on the third set of seismic data generated at block 140. That is, the processing system 60 may convert the seismic or sound waves present in the third set of seismic data into image data that represents features that may be present in a corresponding subsurface region of the earth. The seismic image data may depict the presence of complex geological structures, hydrocarbon deposits, and the like. At block 144, the processing system 60 may identify the hydrocarbon deposits present in the subsurface region that corresponds to the third set of seismic data and display the results the display 72 or the like.

In some embodiments, the processing system 60 may use the OBS data to generate the velocity model and process the first set of seismic data based on the velocity mode to generate another set of seismic data. The new set of seismic data may then be used to generate the seismic image data as discussed above.

As mentioned above, an FWI that may be used for velocity model building in complex geologic areas (e.g., embedded salt layers), may utilize seismic data has been acquired via a long offset and a full azimuth distribution. Moreover, the FWI may use seismic data with good signal-to-noise ratios for very low frequencies (e.g., 1.5-2 Hz) to obtain accurate images. As such, the OBN acquisition according to one or more embodiments described herein could provide the offsets and azimuths that may enable the FWI to effectively generate the seismic images. That is, generating very low frequencies may involve a seismic source that can generate these low frequency source waves. However, because the signal strength of such low-frequency-seismic waves generated by certain seismic sources may be weak, the signal-to-noise of such low frequency-seismic waves may be weak or low as well. As such, the present embodiments described below include a source geometry for the WAZ acquisition that may be used to improve the signal-to-noise for the low-frequency seismic waves.

Figure 6A:
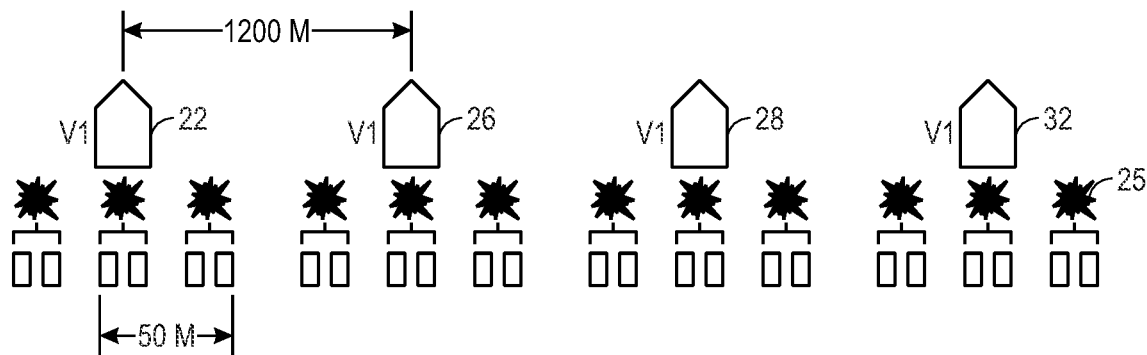
FIG. 6A illustrates an example triple source configuration for layout of FIG. 4, in accordance with embodiments described herein.
Figure 6B:
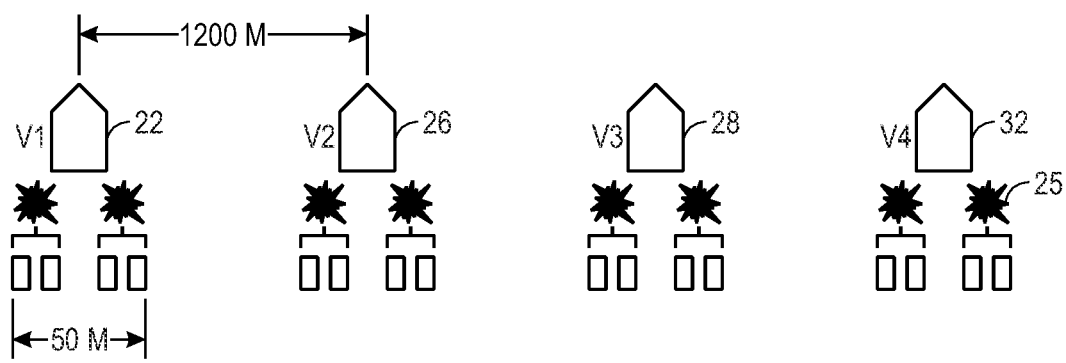
FIG. 6B illustrates an example triple source configuration for layout of FIG. 4, in accordance with embodiments described herein.

With this in mind, in some embodiments, two source arrays or three source arrays may be employed for the WAZ survey, as shown in FIGS. 6A and 6B. That is, referring to FIG. 6A, the source vessels 22, 26, 28, 32 may be separated by 1200 m, as described above, and may each include three seismic sources 25. In the same manner, in FIG. 6B, the source vessels 22, 26, 28, 32 may be separated by 1200 m, as described above, and may each include two seismic sources 25. By using multiple source arrays or seismic sources 25 per vessel, the resolutions of the acquired WAZ survey data and OBN survey data may increase by decreasing the bin size in the lateral direction. That is, each bin is a subdivision of the seismic survey, and bins (cells) are acquired by recording the seismic data into common-midpoint gathers. A common-midpoint may be defined as a point on a surface halfway between a source and a receiver such the point is shared by numerous source-receiver pairs. The bin size is a function of the steamer separation. When each of the vessels includes one source array, the bin size is half of the streamer separation. For example, referring back to FIG. 2, if each of the vessels includes one source array and considering the steamer separation of 100 m, the bin size may be 50 m. According to one or more embodiments, for the dual source arrays and triple source arrays configurations, the bin size may be decreased by a factor of 2 and 3, respectively. For example, if each of the vessels shown in FIG. 2 includes dual source arrays, the bin size would be 25 m. Further, if each of the vessels includes triple source arrays, the bin size would be 16.6 m.

In addition to employing multiple source arrays, different schemes for source firing may be used, as shown in Table 1 for triple source arrays and in Table 2 for dual source arrays below.

sail line would be 75 m. This simultaneous shooting (i.e., source firing) may allow for more efficient data acquisition with higher resolutions.

In some embodiments, when multiple source arrays fire simultaneously, it may be beneficial to differentiate between the shots of the source arrays to obtain higher resolution images. As such, the source arrays may be disposed at different depths to differentiate between the wavelets associated with each source array having different source ghosts. Having different depths for the source arrays may enable better source separation (e.g., deblending) during the processing of the seismic data. Examples of disposing the source arrays at different depths are shown below in Table 1 and Table 2. According to one or more embodiments, even if the source arrays are not fired simultaneously, the source arrays may be disposed at different depths to take advantage of differentiating between the wavelets associated with the source arrays and also to enhance the signal-to-noise at the low frequencies.

Additionally, for the sources that are close to each other, the signal-to-noise may be enhanced based on "shared low

TABLE 1

Triple source potential source firing sequence for WAZ and Sparse OBN acquisition

| Sources | Firing sequnece | Dither type | Nominal shot interval | Shot interval along the line | Source array depth |
|---|---|---|---|---|---|
| Triple source array: Source Array 1 to Source Array 12 | 1 + 4 + 7 + 10 (simultaneous) 2 + 5 + 8 + 11 (simultaneous) 3 + 6 + 9 + 12 (simultaneous) | random | 25 m | 75 | S1 7 m S2 10 m S3 13 m S4 16 m |
| Triple source array: Source Array 1 to Source Array 12 | 1 + 2 + 3 (simultaneous) 4 + 5 + 6 (simultaneous) 7 + 8 + 9 (simultaneous) 10 + 11 + 12 (simultaneous) | deterministic | 25 | 100 m | S1 7 m S2 10 m S3 13 m |

TABLE 2

Dual source potential source firing sequence for WAZ and Sparse OBN acquisition

| Sources | Firing sequnece | Dither type | Nominal shot interval | Shot interval along the line | Source array depth |
|---|---|---|---|---|---|
| Dual source array: Source Array 1 to Source Array 12 | 1 + 3 + 5 + 7 (simultaneous) 2 + 4 + 6 + 8 (simultaneous) | random | 25 m | 50 m | S1, S2 7 m S3, S4 10 m S5, S6 13 m S7, S8 16 m |
| Dual source array: Source Array 1 to Source Array 12 | 1 + 2 (simultaneous) 3 + 4 (simultaneous) 5 + 6 (simultaneous) 7 + 8 (simultaneous) | deterministic | 25 | 100 m | S1 7 m S2 11 m S3 7 m S4 11 m S5 7 m S6 11 m S7 7 m S8 11 m |

According to one or more embodiments, multiple source arrays may shoot the seismic waves simultaneously. For example, as shown in Table 1, for triple source arrays S1-S12, source arrays 1, 4, 7, and 10 may be fired simultaneously. Source arrays 2, 5, 8, and 11, that are located 25 m away, may be fired simultaneously. In the same manner source arrays 3, 6, 9, and 12, located 25 m further, may be fired simultaneously. In this way, the shout interval along the frequency" concept. That is, for very low frequencies, (e.g., below 15 Hz), two sources that are separated by less than half of the seismic wavelength may be considered as a point source. As such, two sources, with 50 m source separation in crossline direction, could be considered a point source for frequencies below 15 Hz.

Keeping the foregoing in mind, benefits of using multiple source arrays that are close to each other may include improving resolution of seismic imaging by reducing the crossline bin interval to half of source array separation, such that streamer separation is larger than the source array separation. Another benefit may include increasing signal-to-noise ratio for the final migrated image because more source points are acquired and the subsurface may be better sampled.

In some embodiments, a dither (e.g., a slight time delay) may be introduced to the simultaneous shots to differentiate between the seismic data associated with the shots. The dithers may be random or predetermined (i.e., deterministic dithers).

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
a plurality of streamers comprising one or more streamer sensors configured to:
acquire a first set of seismic data representative of one or more features of a subterranean region associated with a first time period during which the plurality of streamers is performing a continuous seismic survey and traversing a first plurality of sail lines; and
acquire a second set of seismic data representative of the one or more features associated with a second time period after the first time period, wherein the second set of seismic data is acquired while traversing a second plurality of sail lines of the continuous seismic survey in an opposite direction of the first plurality of sail lines;
a portion of a plurality of ocean bottom nodes the portion of the plurality of ocean bottom nodes comprising less than all of the plurality of ocean bottom nodes, wherein the portion of the ocean bottom nodes is configured to simultaneously acquire a third set of seismic data representative of the one or more features of the subterranean region while the plurality of streamers is acquiring the first set of seismic data, wherein the portion of the plurality of ocean bottom nodes corresponds to a shot sample that is a function of a sail line interval of the first plurality of sail lines; and
a processing system configured to:
process the first set of seismic data and the third set of seismic data to obtain a velocity model of seismic waves for the subterranean region;
generate a fourth set of seismic data representative of the one or more features of the subterranean region based on the velocity model and the second set of seismic data; and
generate one or more seismic images of the subterranean region based on the fourth set of seismic data.

2. The system of claim 1, wherein the first set of seismic data is acquired via a Wide Azimuth (WAZ) survey.

3. The system of claim 1, wherein the first set of seismic data and the second set of seismic data is acquired based on the same seismic source.

4. The system of claim 1, wherein the one or more streamer sensors are configured to:
acquire a fifth set of seismic data representative of the one or more features of the subterranean region while the plurality of streamers traverses a third plurality of sail lines in a same direction of the first plurality of sail lines; and
generate the fifth set of seismic data based on the velocity model, the second set of seismic data, and the fourth set of seismic data.

5. The system of claim 4, wherein the second plurality of sail lines is interleaved with the first plurality of sail lines.

6. The system of claim 4, wherein a first sail line of the first plurality of sail lines and a second sail line of the second plurality of sail lines are separated by 1200 meters.

7. The system of claim 1, further comprising a plurality of source arrays disposed at a plurality of depths, wherein the first set of seismic data and the second set of seismic data is acquired based on one or more seismic waves produced by the plurality of source arrays.

8. A method, comprising:
receiving, via a processor, a first set of seismic data and a second set of seismic data acquired via a Wide Azimuth (WAZ) survey, wherein the first set of seismic data is acquired during a first time period while a plurality of streamers is traversing a first plurality of sail lines, and wherein the second set of seismic data is acquired during a second time period while the plurality of streamers is traversing a second plurality of sail lines opposite the first plurality of sail lines;
receiving, via the processor, a third set of seismic data acquired via an Ocean Bottom Survey (OBS) simultaneously during the first time period, wherein the OBS comprises acquiring the third set of seismic data via a portion of a plurality of ocean bottom nodes corresponding to a shot sample that is a function of a sail line interval of the first plurality of sail lines the portion of the plurality of ocean bottom nodes comprising less than all of the plurality of ocean bottom nodes;
processing, via the processor, the first set of seismic data and the third set of seismic data to obtain a velocity model of seismic waves for an area that corresponds to the WAZ survey and the OBS;
generating, via the processor, a fourth set of seismic data based on the velocity model and the second set of seismic data; and
generating, via the processor, one or more seismic images of the area based on the velocity model and the fourth set of seismic data.

9. The method of claim 8, wherein the WAZ survey is performed using a plurality of vessels configured to acquire the first set of seismic data and the second set of seismic data in a continuous data acquisition over an entirety of the area by sailing in two directions via the first plurality of sail lines and the second plurality of sail lines without overlapping.

10. The method of claim 8, wherein the WAZ survey is performed using a plurality of vessels configured to acquire the first set of seismic data and the second set of seismic data in a continuous data acquisition over an entirety of the area, wherein the first plurality of sail lines and the second plurality of sail lines comprise at least one sail line that overlaps another sail line.

11. The method of claim 10, wherein at least one of the plurality of vessels comprises a plurality of source arrays placed at different depths.

12. The method of claim 8, wherein the first set of seismic data and the second set of seismic data is acquired based on the same seismic source.

13. The method of claim 8, wherein the second plurality of sail lines is interleaved with the first plurality of sail lines.

14. The method of claim 13, wherein the first plurality of sail lines is interleaved with the second plurality of sail lines by half of a sail line interval of the WAZ survey.

15. A non-transitory computer-readable medium comprising computer-executable instructions that, when executed, are configured to cause at least one processor to perform one or more operations comprising:
  receiving a first set of seismic data during a first portion of a Wide Azimuth (WAZ) survey while a plurality of streamers is traversing a first plurality of sail lines and a second set of seismic data during a second portion of the WAZ survey different than the first portion while the plurality of streamers is traversing a second plurality of sail lines opposite the first plurality of sail lines;
  receiving a third set of seismic data acquired via an Ocean Bottom Survey (OBS) simultaneously during a time period in which the first set of seismic data is acquired, wherein the OBS comprises acquiring the third set of seismic data via a portion of a plurality of ocean bottom nodes corresponding to a shot sample that is a function of a sail line interval of the first plurality of sail lines the portion of the plurality of ocean bottom nodes comprising less than all of the plurality of ocean bottom nodes;
  processing the first set of seismic data and the third set of seismic data to obtain a velocity model of seismic waves for an area that corresponds to the WAZ survey and the OBS;
  generating a fourth set of seismic data based on the velocity model and the second set of seismic data; and
  generating one or more seismic images of the area based on the fourth set of seismic data.

16. The non-transitory computer-readable medium of claim 15, wherein the computer-executable instructions are configured to cause the at least one processor to perform the one or more operations comprising:
  receiving a fifth set of seismic data acquired during a third portion of the WAZ survey; and
  generating the one or more seismic images of the area based on the velocity model and the fifth set of seismic data.

17. The non-transitory computer-readable medium of claim 15, wherein the second portion of the WAZ survey is interleaved with the first portion of the WAZ survey.

18. The non-transitory computer-readable medium of claim 17, wherein the first portion of the WAZ survey is interleaved with the second portion of the WAZ survey by half of a sail line interval of the WAZ survey.

19. The non-transitory computer-readable medium of claim 16, wherein the first portion of the WAZ survey and the third portion of the WAZ corresponds to a first direction and the second portion of the WAZ survey corresponds to a second direction opposite to the first direction.

20. The non-transitory computer-readable medium of claim 15, wherein the first set of seismic data and the second set of seismic data is acquired based on the same seismic source.

* * * * *